Jan. 11, 1949.  R. C. DEHMEL  2,458,982
AIRCRAFT TRAINING INSTRUMENT FOR
SIMULATING ATTITUDE GYROS
Filed Sept. 17, 1946
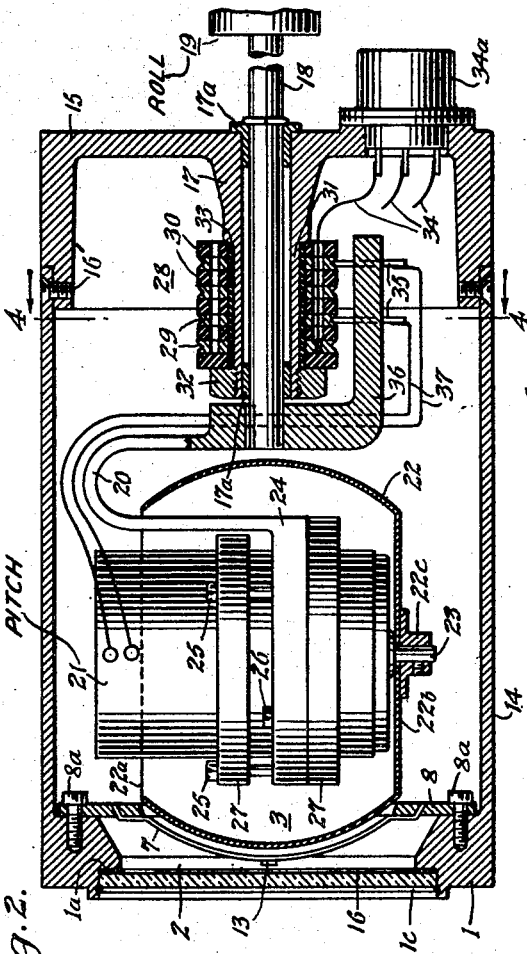
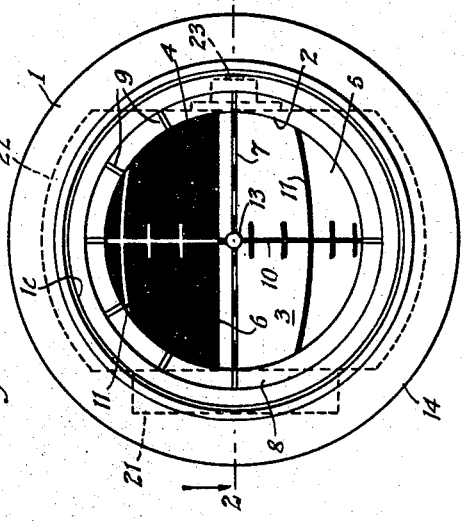
Inventor
Richard Carl Dehmel
By Orin R. Severn
Attorney Patented Jan. 11, 1949

2,458,982

UNITED STATES PATENT OFFICE 2,458,982

AIRCRAFT TRAINING INSTRUMENT FOR SIMULATING ATTITUDE GYROS

Richard Carl Dehmel, Summit, N. J.

Application September 17, 1946, Serial No. 697,473

6 Claims. (Cl. 177—337)

This invention relates to aircraft training instruments for use in grounded or emplaced flight trainers, and particularly to apparatus for simulating an attitude gyro or artificial horizon instrument of the type used in actual aircraft.

It has been proposed for training purposes to simulate the operation of the attitude gyro which is gyroscopically operated to indicate the attitude of the airplane with respect to the natural horizon, by means of two motors, one of which is energized according to simulated control operation, such as of the elevator for example, for raising and lowering a horizon indicating element in accordance with the pitch attitude of the trainer, the other motor being also energized according to control operation such as of the ailerons and rudder, for tilting the aforesaid horizon indicating element in accordance with the bank attitude of the trainer so that various combinations of pitch and bank attitudes may be indicated. Heretofore apparatus of this character has in general been limited in its application to the more elementary types of trainers by reason of complicated mechanical structure and a narrow range of operation.

The mechanical arrangement for simulating the operation of a true attitude gyro when maneuvers such as rolls, dives and loops are involved must be accurately designed and sufficiently flexible in operation to provide for free movement of the horizon indicating element in a realistic manner through a complete loop or roll, in addition to the more common flight maneuvers. According to the present invention this is accomplished by comparative simple and efficient structure arranged so that precision and sensitiveness of the instrument are not impaired by common mechanical faults such as friction, backlash and inertia.

A principal object of this invention therefore is to provide improved attitude gyro training apparatus of the character above described that is simple and rugged in construction, and efficient and flexible in its operation for accurately and realistically indicating any attitude of aircraft throughout the most complex simulated maneuvers.

The invention will be more fully set forth in the following description referring to the accompanying drawing, and the features of novelty will be pointed out with particularity in the claims annexed to and forming a part of this specification.

Fig. 1 is a view of the front panel of the artificial horizon simulating apparatus embodying the present invention;

Fig. 2 is a sectional plan view of the aforesaid apparatus taken along the line 2—2 of Fig. 1;

Fig. 3 is a view similar to Fig. 1 indicating a bank attitude; and

Fig. 4 is a sectional view taken along the line 4—4 of Fig. 2.

The apparatus of the present invention for simulating an attitude gyro or artificial horizon is provided with the usual instrument indications on the front face as shown by Fig. 1 wherein the front panel 1 is provided with a circular opening 2 through which the movable part 3 representing the horizon is visible. In conventional practice the movable part has a generally spherical surface, Fig. 2, and has contrasting markings 4 and 5 thereon representing earth and sky respectively, the line of demarkation 6 representing the horizon. In its normal position indicating level flight the horizon line is alined with suitable fixed means defining a "lubber-line" horizontally disposed across the middle of opening 2, such as the index wire 7 carried by the dial 8 forming part of the front panel. Since in practice the "lubber-line" moves with the aircraft about the gyro element, the horizon line will appear above the "lubber-line" as shown for example in Fig. 1 to indicate climb, and below the "lubber-line" to indicate dive. The dial is also provided with additional markings 9 for assisting the pilot in gauging the bank attitude when the horizon line is tilted from its normally level position, as in a 30° bank to the right, Fig. 3, for example. Also for this purpose the movable part 3 has a vertical center mark 10.

The movable part is likewise provided with additional horizontal markings 11 for assisting the pilot in gauging the pitch attitude, i. e., the climb or dive angle, when the line 6 moves above or below the fixed horizontal index wire 7. The index wire 7 may be for convenience provided with distinctive black and white alternating marks and a central boss or button 13. If desired, the button 13 may be in the form of a miniature airplane that is vertically adjustable in order to compensate for changes in trim of the aircraft according to standard instrument design. The artificial horizon apparatus above described is for practical purposes identical in outward appearance to that commonly used in actual aircraft, the present invention being primarily concerned with the simulation of true attitude gyro operation.

Referring more particularly to Fig. 2, the apparatus is enclosed in a cylindrical housing 14 having an apertured front wall panel 1 previously referred to and a rear wall portion 15 of cup-like form that is suitably secured at 16' to the cylindrical housing. The front wall is provided with an annular shoulder 1a at the periphery of the circular opening 2 in which is mounted a transparent cover 16 that is secured in position by a spring ring 1c. The dial 8, on which is mounted the horizontal index wire 7, is secured at 8a to the rear of the front wall.

The rear wall is provided with an inwardly extending central hub 17 having bearing bushings 17a for the operating shaft 18 that is controlled in accordance with the bank attitude. This shaft may be operated in any suitable manner to indicate a simulated attitude of bank, such as by a servomotor generally indicated at 19, which may be of the two phase type for continuous and reversible operation.

The movable part 3 of the artificial horizon assembly is carried by and rotatable with the shaft 18 and comprises a supporting bracket 20 secured to the end of shaft 18, a pitch attitude motor 21 clamped to the bracket 20 and a generally spherical shell 22 mounted on the operating shaft 23 of the pitch attitude motor so that the shell rotates about and substantially encloses the motor, thereby providing a simple, compact and mechanically efficient unit. The bracket 20 is of U-shape so that it can extend through a lateral opening 22a of the shell as shown without interference therewith, and terminates in an annular support 24 in which the motor 21 is mounted so that the longitudinal axes of shafts 18 and 23 intersect. The motor is clamped in this position by bolts 25 and 26 extending between the support 24 and flanges 27 secured to the motor casing. The stub shaft 23 of the motor 21 is suitably secured to an end wall 22b of the shell 22 by means of a boss 22c secured to the shell.

By reason of this simple and compact arrangement the shell 22, which carries on its exterior surface the horizon markings illustrated in Fig. 1, is capable of continuous or free rotation in either direction so that it is capable of "following through" in the case of complex maneuvers involving for example, a series of outside and inside loops. In the same manner, the complete assembly 3 is capable of continuous or free rotation in either direction by the shaft 18 so that the spherical indicating surface of the artificial horizon can also follow through a series of roll maneuvers if necessary. Obviously the apparatus will indicate a combination of roll and loop maneuvers by corresponding operation of both motors 19 and 21.

The electrical connections to the motor 21 which may also be of the two phase type may include a slip ring assembly 28 comprising a plurality of conducting slip rings 29 spaced by insulating discs 30, all mounted on and insulated from a reduced extension 31 of the fixed hub 17. A lock nut 32 holds the slip ring assembly in position against a shoulder 33 on the hub. Conductor leads indicated at 34 interconnect in a suitable manner the exterior circuit represented by the plug connection 34a to the individual slip rings respectively which are in turn engaged by the movable brushes 35, Fig. 4, mounted on an offset extension 36 of the bracket 20. The brushes are suitably connected as indicated by conductor leads 37 to the motor 21.

A description of the specific control for the motors 19 and 21 is not necessary for an understanding of the present invention, it being sufficient to state that the motors are energized in accordance with manipulation of aircraft controls by the student pilot as he simulates various maneuvers; or if desired, the motors may be of the repeater type and controlled by an instructor who can observe the reactions of the student to the attitude changes of the instrument.

It will be apparent from the foregoing that simulation of the action and appearance of an attitude gyro in actual flight requires that the operation of corresponding apparatus in an employed trainer be opposite to that of the attitude gyro, i. e. the ball element must move with respect to the panel instead of vice versa. Accordingly, since in the present invention the panel 1 is fixed, a bank with the right wing down for example is represented by rotation of the shaft 18 so as to indicate a left inclination of the horizon line (Fig. 3), and pitch, such as raising of the nose is represented by rotating the ball by means of the motor 21 so as to raise the horizon line above the lubber-line (Fig. 1). Thus as the angle of climb is increased more of the white area 5 appears at the instrument face until the nose is pointed upward at such an angle that the entire face shows white; and in a very steep or vertical dive the ball is rotated in the opposite direction until the entire face shows black. In the case of inverted flight the ball will be rotated 180° so that the upper portion shows white and the lower portion black.

It should be understood that the ball markings and lubber-line arrangement shown herein are merely illustrative and that my invention is not limited to any specific marking or configuration at the instrument face.

It should also be understood that this invention is not limited to specific details of construction and arrangement thereof herein illustrated, and that changes and modifications may occur to one skilled in the art without departing from the spirit of the invention.

What is claimed is:

1. Aircraft training apparatus for simulating an artificial horizon comprising means adapted for continuous and reversible rotation according to the operation of a bank attitude motor, a pitch attitude motor bodily carried by said rotatable means and a generally spherical member for representing an artificial horizon movable with and arranged for continuous and reversible rotation by said pitch attitude motor so that said spherical member is adapted to assume all attitudes of aircraft in simulated complex maneuvers.

2. Aircraft training apparatus for simulating an artificial horizon comprising a shaft operatively connected to a bank attitude motor adapted for continuous and reversible rotation, a pitch attitude motor bodily mounted on said shaft for rotation therewith, and a generally spherical element likewise rotatable with said shaft and connected to the operating shaft of said pitch attitude motor for continuous rotation in either direction, said spherical element having an artificial horizon representation normally transverse to said first shaft and parallel with the shaft of said pitch attitude motor so that said spherical member is adapted to assume all attitudes of aircraft in simulated complex maneuvers.

3. Aircraft training apparatus for simulating an artificial horizon comprising a shaft operatively connected to a bank attitude motor adapted for free and reversible rotation, a pitch attitude motor carried by said shaft so as to rotate therewith, and a spherical shell-like member carried by the operating shaft of said pitch attitude motor so as to rotate therewith without interference in either direction, said spherical member substantially enclosing said pitch attitude motor and having an artificial horizon representation so that said spherical member is adapted to assume all attitudes of aircraft in simulated complex maneuvers.

4. Aircraft training apparatus for simulating an artificial horizon comprising a shaft operatively connected to a bank attitude motor for free rotation in either direction, a pitch attitude motor carried by said shaft so as to rotate therewith, a generally spherical shell-like member secured to the operating shaft of said pitch attitude motor so as substantially to surround said motor and to rotate freely with said shaft in either direction, the exterior surface of said member having indicia thereon representing an earth and sky horizon, said member having an open end for means supporting said pitch motor from said first-named shaft, and a fixed panel having an opening opposite a portion of said spherical member for observation of the position of said horizon indicia with respect to the panel.

5. Aircraft training apparatus for simulating an attitude gyro or artificial horizon comprising a member arranged for free rotation in either direction in accordance with simulated bank attitude, a pitch attitude motor, a U-shaped bracket secured to said member for bodily supporting said motor, and a hollow ball substantially enclosing said motor and carried by the operating shaft of said motor for free rotation in either direction so that said ball is adapted to assume all attitudes of aircraft in simulated complex maneuvers, the exterior surface of said ball having indicia thereon representing an earth and sky horizon.

6. An aircraft training instrument for simulating an artificial horizon comprising a housing having an opening in a wall thereof, a hollow ball-like shell disposed in said housing opposite said opening and having earth and sky horizon indicia on the exterior surface thereof, a pitch attitude motor disposed within said shell and connected to said shell for rotating it freely in either direction in accordance with pitch attitude simulation, a bank attitude motor having a shaft freely rotatable in either direction, and structure securing said pitch attitude motor to said shaft so that both it and said shell rotate as a unit with said shaft in accordance with bank attitude simulation.

RICHARD CARL DEHMEL.

REFERENCES CITED

The following references are of record in the file of this patent:

UNITED STATES PATENTS

| Number | Name | Date |
|---|---|---|
| 2,379,869 | Baker | July 10, 1945 |
| 2,381,872 | Baker | Aug. 14, 1945 |